9/10/85 OR 4,540,868

United States Patent [19]

Liebing

[11] Patent Number: 4,540,868

[45] Date of Patent: Sep. 10, 1985

[54] PLASMA GUN THAT REDUCES CATHODE CONTAMINATION

[75] Inventor: Lothar Liebing, Stuttgart, Fed. Rep. of Germany

[73] Assignee: Deutsche Forschungs- und Versuchsanstalt für Luft- und Raumfahrt e.V., Bonn, Fed. Rep. of Germany

[21] Appl. No.: 471,694

[22] Filed: Mar. 3, 1983

[30] Foreign Application Priority Data

Mar. 6, 1982 [DE] Fed. Rep. of Germany ....... 3208085
Feb. 3, 1983 [DE] Fed. Rep. of Germany ....... 3303677

[51] Int. Cl.[3] .......................... B23K 9/00; H05H 1/00

[52] U.S. Cl. ..................... 219/121 PM; 219/121 PR; 219/121 PQ; 219/121 P; 219/121 PL; 313/231.41; 204/192 N; 156/345

[58] Field of Search ...... 219/121 P, 121 PP, 121 PM, 219/121 PR, 121 PQ, 75, 76.16, 121 PL; 313/231.31, 231.41, 231.51, 231.61; 204/192 E, 164, 192 EC, 192 R, 192 C; 156/345

[56] References Cited

U.S. PATENT DOCUMENTS 3,770,935 11/1973 Tatero et al. ................. 219/121 PR
4,236,059 11/1980 McComas et al. .............. 219/121 P
4,284,879 8/1981 Eveson et al. .................. 219/121 P

FOREIGN PATENT DOCUMENTS 2194105 2/1974 France ............................ 219/121 P

*Primary Examiner*—M. H. Paschall
*Attorney, Agent, or Firm*—Kenway & Jenney

[57] ABSTRACT

In order to avoid contamination of a bombarding plasma jet by the products of cathode erosion in a plasma gun having a cathode and an anode, with which a connecting plasma is produced which strikes vertically onto the bombarding plasma jet and flows through a cooled duct between the cathode and the bombarding plasma jet, it is suggested that the cathode should be located in an enclosed cavity, the duct emerging from a wall of this cavity and the cathode being laterally offset relative to the inlet port to the duct, and that a gas supply line should open into the duct between the inlet port and the end of the duct facing the bombarding plasma jet, gas being supplied through this supply line as a substitute for the deposited cathode material in order to maintain a substantially constant particle density in the connecting plasma.

12 Claims, 2 Drawing Figures

PLASMA GUN THAT REDUCES CATHODE CONTAMINATION

Figure 1:
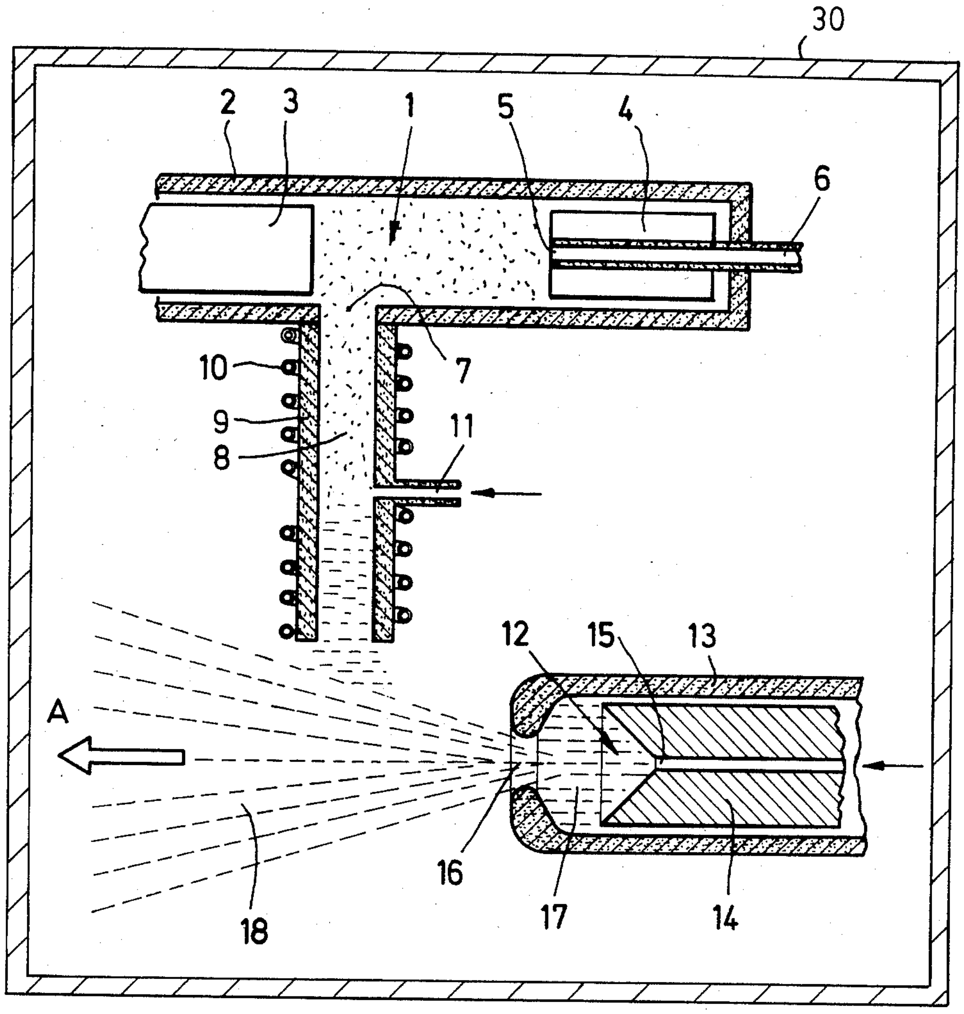

The invention relates to a plasma gun having the features of the preamble to claim 1.

When manufacturing semi-conductors the addition of additives is of great importance, e.g. when doping, implanting or passivating. Furthermore, it is necessary for these additives to have a specific kinetic energy when coming into contact with the semi-conductor and for them to be present in a specific form, as molecule, atom or ion.

The additions of additives at low and at high energies are known technologies: at low energy (1/10 eV) thermal diffusion and at high energy (over 1 KeV) ionic implantation. The possibilities offered for the middle energy range of 10–100 eV have so far been limited.

It is known that ions may be extracted from a plasma by means of an electric field (glow discharge, arc discharge, high frequency discharge). The energy and yield of the extracted ions depends on the voltage of the extracting field. In the case of low voltages (100 V) resulting in energies of 100 eV the yield in extracted ions is extremely small. For this reason no importance is attached to this method of bombarding semi-conductors. In addition, the vacuum is loaded by non-accelerated neutral gas. The unavoidable contamination by electrode sputtering involved with this method is particularly troublesome.

It is also known that ions in a plasma discharge may be accelerated to energies in the region considered, the entire plasma being accelerated eletromagnetically. This method results in high yields of accelerated ions and to the load on the vacuum caused by non-accelerated particles being low. Difficulties arise, however, with this known method due to contamination of the plasma by the cathode erosion.

In the case of another known device, with which the cathode is disposed in a tube arranged vertically to the bombarding plasma duct (FR-PS 21 94 105), the products of cathode erosion unavoidably pass into the bombarding plasma jet. The cathode of this construction is encircled by a cooled casing but the gas forming the bombarding plasma jet does pass directly into the region situated in front of the cathode and therefore carries the products of cathode sputtering with it into the bombarding plasma jet. This cannot be prevented by the cooled wall of the tube surrounding the cathode since the diameter of this tube is very large and the distance between cathode and gas jet small.

It is also known that an acceleration of the ions may be achieved in a special arc discharge without a magnetic field if the particles to be accelerated are supplied in the anode area. Even with this discharge the problem still arises that the plasma will be unavoidably contaminated by cathode erosion.

The object underlying the invention is to find a plasma gun of the type described at the beginning, with which it is possible to form a bombarding plasma jet, in which additives can be accelerated to a kinetic energy of 10–100 eV (in a vacuum) with a large yield, the plasma thereby not containing any impurities caused by cathode erosion.

In the case of a plasma gun of the type described at the beginning this object is accomplished, according to the invention, by the characterizing features of claim 1.

With this arrangement the impurities (metal plasma) contained in the connecting plasma due to cathode sputtering will be deposited on the cooled surfaces in the interior of the duct so that they cannot pass into the bombarding plasma jet. This effect is intensified by the fact that the cathode is laterally offset relative to the inlet port to the duct so that the impurities emitted from the cathode largely fly passed the inlet port to the duct and do not pass into the duct at all. Only a very small proportion of the impurities is suitably deflected so that it can actually enter the inlet port to the duct.

By supplying gas to the cooled duct between inlet port and outlet end it is possible for the particles, which separate out within the duct due to metal plasma being deposited, to be replaced again so that a substantially constant particle density results along the entire length of the duct. In addition, the introduction of gas into the duct generates a current in this duct such that one part of the gas flows towards the outlet and another part towards the inlet. The part of the flow directed towards the inlet also prevents impurities from the cathode region entering the duct, i.e. the lateral offsetting of the cathode and the part of the gas flowing from the middle of the duct towards the inlet port effectively prevent the products of cathode erosion passing through the duct and into the bombarding plasma jet. It is favourable in this connection for the gas supplied to the anode region to form the bombarding plasma jet and the gas supplied to the duct to have the same composition.

In the case of a preferred embodiment of the invention a supply line may open into the cavity to supply the gas for producing the connecting plasma. It is advantageous to have an auxiliary anode located in the cavity; this can have the same potential as the anode and serves to aid discharge.

The arrangement is preferably chosen such that the gas forming the bombarding plasma jet flows through the anode and the duct ends downstream of the outlet in the anode for the bombarding plasma jet.

In the case of a preferred embodiment the cathode abuts in the cavity on the wall, from which the duct emerges. It is also possible for the cathode to be embedded in the cavity in the wall, from which the duct emerges, and for its only exposed surface to be that facing the cavity. In the case of such a construction erosion products released from the cathode surface have to be diverted through 180° in order to be able to enter the duct. In other words, the impurities emitted by the cathode are emitted in a direction contrary to the direction of the duct so that it is made more difficult, with the aid of the gas flowing from the duct, for impurities to enter this duct.

In this respect it is possible to provide for the cathode to encircle the duct. It is then favourable to have the cathode encircled by and spaced from an annular auxiliary anode, which is also preferably embedded in or abuts on the wall, from which the duct emerges.

It is particularly advantageous to have the duct projecting into the cavity, preferably to such an extent that the inlet opening is located in the plane of the cathode surface facing the cavity. This arrangement also prevents products of cathode erosion entering the duct, especially when the duct inlet port projects into the cavity beyond the upper face of the cathode.

The splitting up of the gas flow supplied from the gas supply line is aided by having the gas supply line opening radially into the duct. It is also advantageous to have the gas supply line opening into the duct approximately midway between the inlet port and the opposite end of the duct.

The depositing of the products of cathode erosion, which do enter the duct, may, in the region of the duct, be brought about by a cooling of the duct wall. It is, however, also possible to provide special cooling surfaces in the interior of the duct; for example, these could be formed by axis-parallel tubes, through which a cooling medium flows.

The introduction of gas into the cavity may be particularly advantageous with a view to increasing the particle density in the area in front of the cathode. This will also, together with the fact that the duct branches off in the region close to the cathode, lead to the connecting plasma, which enters the duct, containing as a whole a lesser density of the metal plasma resulting from cathode sputtering.

In the case of a further, preferred embodiment the anode is disposed in an electrically insulating, enclosed chamber, which has a supply line for the gas as well as an outlet port for the bombarding plasma.

The following description of preferred embodiments of the invention serves in conjunction with the drawings to give a more detailed explanation. The drawings show:

FIG. 1 a schematic side view of a first embodiment of a plasma gun and

Figure 2:
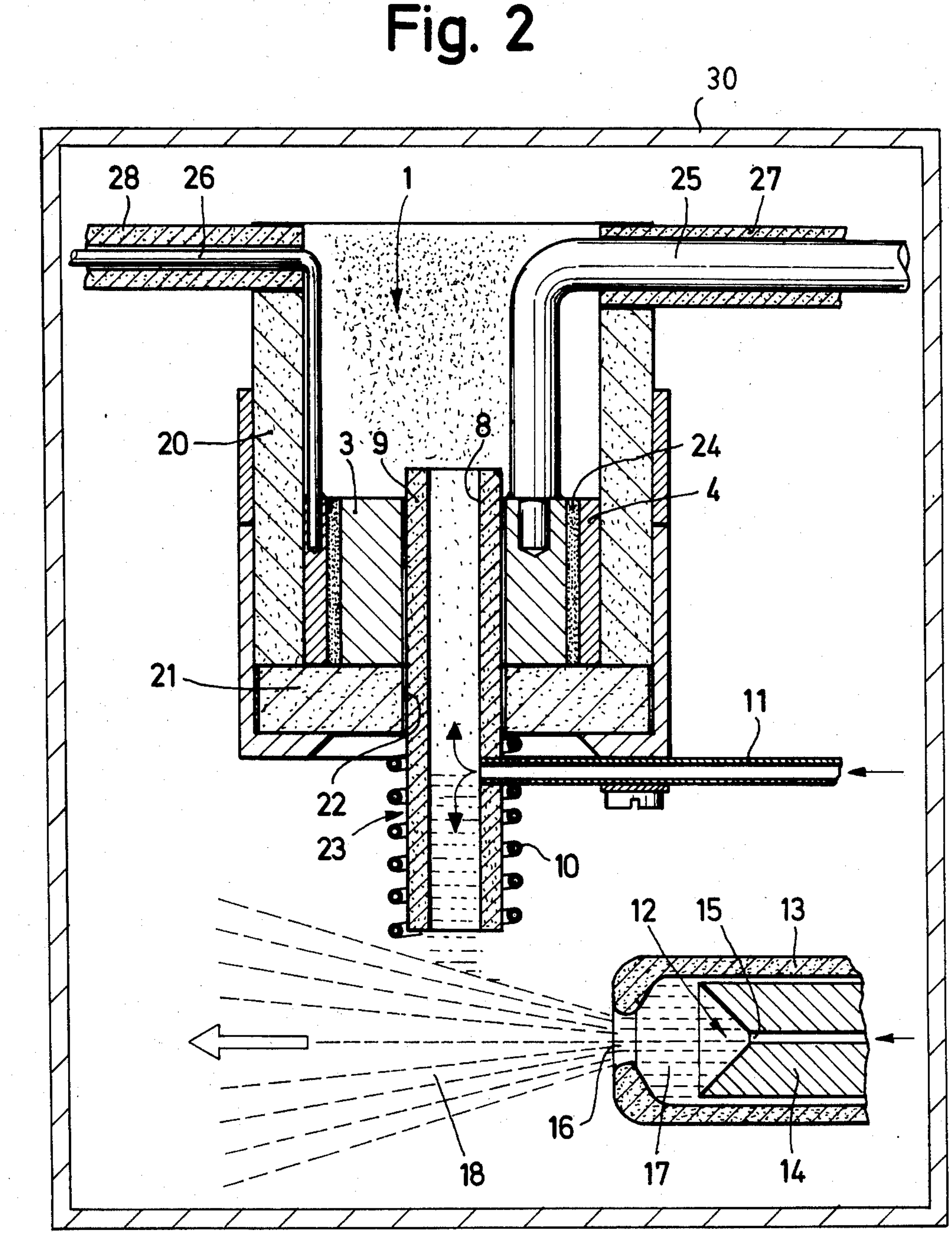

FIG. 2 a view similar to FIG. 1 of a modified embodiment of a plasma gun.

First of all, reference is made to the embodiment of FIG. 1. A cavity 1, which has insulating walls 2 and is enclosed on all sides, contains on one side a metallic cathode 3, which is not illustrated in full in the drawing, and on the opposite side an auxiliary anode 4 which is also made of metal. This auxiliary anode has a supply of gas 5 running through it, which is connected with a supply line 6.

An opening or port 7 is located in a side wall of the cavity 1 at the cathode end of the discharge section between cathode 3 and auxiliary anode 4. This port is connected to a duct 8 extending perpendicular to the discharge section. The walls 9 of duct 8 also consist of electrically insulating material and are surrounded by a spiral cooling coil 10, through which a cooling medium may be guided for cooling the walls 9. The length of the duct is substantially greater than its diameter, for example 3 to 5 times as great, so that a relatively narrow and long flow duct results which forms the only outlet from the cavity 1.

A gas supply line 11 opens radially into the interior of the duct 8 approximately midway between the port 7 and the opposite end of the duct 8.

An anode 14 with a central supply duct 15 is disposed in a further, enclosed cavity 12 with walls 13 consisting of an electrically insulating material. The extension of the supply duct 15 contains, on the front wall of the cavity 12, an opening 16 which connects the anode chamber 17 between anode 14 and wall 13 with the surroundings.

During operation the cavity 1 with cathode and auxiliary anode, the duct leading from it and the cavity 12 with the anode are placed in an evacuated vessel 30. The supply line 6, gas supply line 11 and the supply duct 15 are connected in a way not shown in the drawings with corresponding gas sources, preferably with the same source. In addition, the electrodes are connected with suitable voltage sources; this is also not illustrated in the drawings.

When a voltage is applied an arc discharge occurs between the cathode 3 and the anode 14, a metal plasma formed by cathode erosion and the gas supplied through the supply line 6 serving as carriers of the arc discharge in the area in front of the cathode. Similar conditions are found in the tubular duct 8 in the inlet region on the side of the cathode. Due to the cooling of wall 9 the metal plasma coming into contact with this cooled surface is deposited on the inner wall of duct 8 so that the particle density in the duct 8 is continually decreasing. This is compensated by the supply of gas through the gas supply line 11 so that the discharge, at the end of the tubular duct 8 farthest from the cathode, is carried exclusively by the gas entering through the gas supply line 11.

The discharge will lead to both an ionization and dissociation of molecules in the gas introduced into the anode chamber via the supply duct 15, this resulting in a plasma which is designated in the following as bombarding plasma. This bombarding plasma forms a bombarding plasma jet issuing from opening 16 and widening in the direction of arrow A. The bombarding plasma jet contains ions which have been accelerated by the discharge field. This acceleration is transmitted to the other particles in the bombarding gas by the effects of charge transfer and by thermal collisions so that, altogether, the particles in the bombarding plasma jet have the desired kinetic energy distribution. The dissociation and partial ionization of the bombarding gas take place substantially in the anode chamber and in the region of opening 16.

The arrangement of the cavity 1 and the tubular duct 8 relative to the anode chamber is selected such that the gas issuing from the tubular duct 8 is substantially directed vertically onto the bombarding plasma jet. This measure increases the purity of the bombarding plasma since any metal plasma particles from the cathode, which may still be present in the connecting plasma flowing through the duct, will fly vertically through the bombarding plasma jet and not touch the substrate to be treated, which is brought into the bombarding plasma jet downstream of the duct 8.

This forms a double protection against impurities in the bombarding plasma, on the one hand due to the metal plasma being deposited on the cooled walls of the duct and on the other hand due to the fact that the connecting plasma passes vertically into the bombarding plasma jet. The depositing of the metal plasma is aided by the length and relatively narrow diameter of the duct since the gas flows along for a relatively long time and relatively close to the cooled walls of the duct.

The laterally offset arrangement of the cathode 3 relative to the duct also enables a substantial part of the metal plasma to be prevented from entering the duct 8 so that only a small proportion of the metal plasma is deflected and passes into the duct. This is also made more difficult in that the gas entering through the gas supply line 11 divides within the duct into two streams, i.e. one stream of gas directed towards the end of the duct and one entering the cavity 1. The latter stream of gas prevents the metal plasma from entering the duct and therefore effects, in addition, a decrease in the concentration of erosion products in the connecting plasma.

Various gases may be used, the most favourable being, for example, hydrogen, fluorine, chlorine and doping gases such as phosphine or diborane. The electrically insulating walls of cavity 1, chamber 12 and duct 8 consist preferably of ceramics, in particular aluminum oxide ceramics.

The auxiliary anode 4 is not necessarily required but it does serve to aid discharge.

It is also not absolutely necessary to provide a separate gas supply line 5 in the cavity 1 surrounding the cathode. The metal plasma resulting from cathode sputtering is also capable of carrying the discharge. Nevertheless, it is advantageous to feed gas to the cathode cavity since this causes a gas to enter the duct which contains a lower proportion of impurities.

In the case of the gas supply 11 it is essential that the particle density in the duct is kept substantially constant by this gas supply. It would also be possible to use a plurality of gas supply lines distributed over the length of the duct in order to compensate for the increasing impoverishment of the connecting plasma with regard to metallic impurities along the duct. However, it is favourable to use the arramgement shown in FIG. 1 since this results in the formation of two gas flows as described, the gas flow which is directed upwards preventing metal plasma from entering the duct. The arrangement shown in FIG. 2 is similarly constructed to that of FIG. 1, corresponding parts having the same reference numerals.

The cavity 1 is formed in the embodiment according to FIG. 2 by a circular cylinder 20 closed at its lower side by a bottom 21. On its upper side the cavity may be closed by a cover not illustrated in the drawing. Cylinder 20, bottom wall 21 and the cover consist of electrically insulating material, for example ceramics, in particular aluminum oxide ceramics.

A tube 23 made of ceramic material protrudes into the interior of the cavity 1 through a central opening 22 in the bottom wall 21. This tube 23 surrounds the duct 8 which forms a connection between the cavity 1 and the bombarding plasma jet 18. As in the embodiment according to FIG. 1 the walls of the duct are encircled below the bottom wall 21 by a cooling coil 10 which cools the duct walls. A radial gas supply line 11 enters the tube 23 directly beneath the bottom wall 21.

The part of the tube 23 projecting into the cavity 1 is encircled by an annular cathode 3, which rests on the bottom wall 21, the tube 23 protruding slightly beyond this cathode. An annular auxiliary anode 4 concentrically encircles and is spaced from the cathode 3; the auxiliary anode also rests on the bottom wall 21 and is of the same height as the cathode. An electrically insulating connection layer 24 is disposed between the cathode 3 and the auxiliary anode 4.

The cathode 3 is connected with a metallic supply line 25, the auxiliary anode with a metallic supply line 26, both supply lines emerging radially from the cavity and being surrounded outside the cavity by an electrically insulating tube 27 or 28.

Cavity and tube 23 are disposed relative to the anode such that the free end of the duct 8 opens, in the same way as in the embodiment according to FIG. 1, vertically into the bombarding plasma jet 18 and downstream of the outlet port 16 of the chamber for the anode, which is otherwise constructed in the same way.

The arrangement of FIG. 2 is substantially operated in the same way as that according to FIG. 1. A particular advantage of this arrangement is that the cathode encircles the tube 23 defining the duct so that the metal plasma is emitted from the cathode into the cavity 1 in a direction opposite to the direction of flow through the duct 8. Due to this measure it is particularly difficult for the metal plasma to make its way through the duct 8 and the purity of the connecting plasma issuing from the duct 8 can therefore be considerably improved. The embodiment in FIG. 2 is not provided with its own supply of gas to the cavity 1; with this arrangement the gas is supplied exclusively via the gas supply line 11. As already explained and indicated in FIG. 2 by the two arrows the gas flow entering via the gas supply line 11 is divided into two streams, one of which is directed towards the cavity 1. This gas flow prevents the metal plasma from entering the duct 8 and therefore contributes to increasing the purity of the connecting plasma. The other gas flow compensates for the particle loss in the connecting plasma, which results from metal plasma being deposited on the cooled wall of tube 23.

I claim:

1. A plasma gun comprising an evacuatable vessel, wall means defining a cathode cavity, a cathode and an anode arranged in said evacuatable vessel to produce a connecting plasma and a bombarding plasma jet with said cathode being located in said cathode cavity, said cathode eroding during operating and producing particles of cathode material in said connecting plasma, a cooled duct having an inlet port and an outlet port and connected to said cathode cavity at said inlet port, said cathode being arranged in said cathode cavity such that it is laterally offset relative to the inlet port of the cooled duct, and said cooled duct defining the orientation of said connecting plasma, a first supply line for a gas stream connected through said anode to form said bombarding plasma jet downstream of said anode, said anode being laterally offset relative to the outlet port of said cooled duct such that a gas discharge duct for said bombarding plasma jet is formed at an angle of approximately 90° with respect to said cooled duct, and a second gas supply line that opens into said cooled duct between said inlet port and the outlet port of said cooled duct adjacent said bombarding plasma jet, gas being supplied through said second gas supply line as a substitute for a portion of said cathode material deposited on said cooled duct in order to maintain a substantially constant particle density in said connecting plasma formed between said cathode and said bombarding plasma jet.

2. Plasma gun according to claim 1, further comprising a third supply line (6), which supplies a gas for producing the connecting plasma and which opens into the cavity (1).

3. Plasma gun according to claim 1, characterized in that an auxiliary anode (4) is located in the cavity (1).

4. Plasma gun according to claim 1, characterized in that the cathode (3) in the cavity (1) abuts on the wall (21), from which the duct (8) emerges.

5. Plasma gun according to claim 1, characterized in that the cathode (3) in the cavity (1) is embedded in the wall, from which the duct (8) emerges, and its only exposed side is that facing the cavity (1).

6. Plasma gun according to either of claims 4 or 5, characterized in that the cathode (3) encircles the duct (8).

7. Plasma gun according to claim 6, characterized in that the cathode (3) is encircled by and spaced from an annular auxiliary anode (4).

8. Plasma gun according to claim 7, characterized in that the auxiliary anode (4) is embedded in or abuts on the wall (21), from which the duct (8) emerges.

9. Plasma gun according to claims 4 or 5, characterized in that the duct (8) extends into the cavity (1).

10. Plasma gun according to claim 9, characterized in that the duct (8) extends into the cavity (1) by at least such a distance that the inlet port is located in the plane of the cathode surface facing the cavity (1).

11. Plasma gun according to claim 1, characterized in that the gas supply line (11) opens radially into the duct (8).

12. Plasma gun according to claim 11, characterized in that the gas supply line (11) opens into the duct (8) approximately midway between the inlet port and the opposite end of said duct (8).

* * * * *